US010266739B2

(12) United States Patent
Bronson et al.

(10) Patent No.: US 10,266,739 B2
(45) Date of Patent: Apr. 23, 2019

(54) COMPOSITIONS, DEVICES, SYSTEMS AND METHODS FOR CONCENTRATING SOLAR POWER

(71) Applicant: Board of Regents, The University of Texas System, Austin, TX (US)

(72) Inventors: Arturo Bronson, El Paso, TX (US); Vinod Kumar, El Paso, TX (US); Sanjay Shantha-Kumar, El Paso, TX (US); Arturo Sepulveda, Santa Teresa, NM (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 427 days.

(21) Appl. No.: 14/987,683

(22) Filed: Jan. 4, 2016

(65) Prior Publication Data

US 2016/0194543 A1    Jul. 7, 2016

Related U.S. Application Data

(60) Provisional application No. 62/099,311, filed on Jan. 2, 2015.

(51) Int. Cl.
*B60K 16/00* (2006.01)
*C09K 5/14* (2006.01)
(Continued)

(52) U.S. Cl.
CPC .............. *C09K 5/14* (2013.01); *C09K 5/12* (2013.01); *C23C 8/34* (2013.01); *F03G 6/003* (2013.01);
(Continued)

(58) Field of Classification Search
CPC .. C09K 5/14; C09K 5/12; F03G 6/003; C23C 8/34; F24J 2/07
(Continued)

(56) References Cited

U.S. PATENT DOCUMENTS

2010/0303716 A1* 12/2010 Jin ................... A61M 37/0092
424/1.11
2012/0161098 A1* 6/2012 Hiura ................. C23C 16/0218
257/9
(Continued)

FOREIGN PATENT DOCUMENTS

WO    WO 2009142438 A2 * 11/2009 ............... C09K 5/14

OTHER PUBLICATIONS

Dunham, M.T., and Lipinski, W. "Thermodynamic analyses of single Brayton and combined Brayton-Rankine cycles for distributed solar thermal power generation." Journal of Solar Energy Engineering (2013).
(Continued)

*Primary Examiner* — Jason Shanske
(74) *Attorney, Agent, or Firm* — Norton Rose Fulbright US LLP

(57) ABSTRACT

Compositions, devices, systems, and methods directed to concentrating solar power are disclosed. In certain aspects, the disclosure is directed to a heat storage material comprising a transformative alloy composition (internal core component) Al—B—Si—Fe/$Al_2O_3$—$B_2O_3$—$SiO_2$—$Fe_3O_4$ embedded in a SiC outer coating.

13 Claims, 3 Drawing Sheets

(51) Int. Cl.
*F03G 6/00* (2006.01)
*C23C 8/34* (2006.01)
*C09K 5/12* (2006.01)
*F24J 2/07* (2006.01)
*F24J 2/34* (2006.01)
*F28D 20/00* (2006.01)
*F28D 20/02* (2006.01)

(52) U.S. Cl.
CPC .................. *F24J 2/07* (2013.01); *F24J 2/34* (2013.01); *F28D 20/003* (2013.01); *F28D 20/0056* (2013.01); *F28D 20/02* (2013.01); *Y02E 10/41* (2013.01); *Y02E 10/46* (2013.01); *Y02E 60/142* (2013.01); *Y02E 70/30* (2013.01)

(58) Field of Classification Search
USPC .......................................... 60/641.8; 252/71
See application file for complete search history.

(56) References Cited

U.S. PATENT DOCUMENTS

2013/0115513 A1* 5/2013 Choi ................... H01M 4/0416
 429/213
2015/0353737 A1* 12/2015 Siripurapu ............. C08K 3/346
 427/117

OTHER PUBLICATIONS

Anderson, Bruce. "Brayton Cycle Baseload Power Tower CSP System." DOE SunShot Program Review Presentation (Apr. 23, 2013).

* cited by examiner

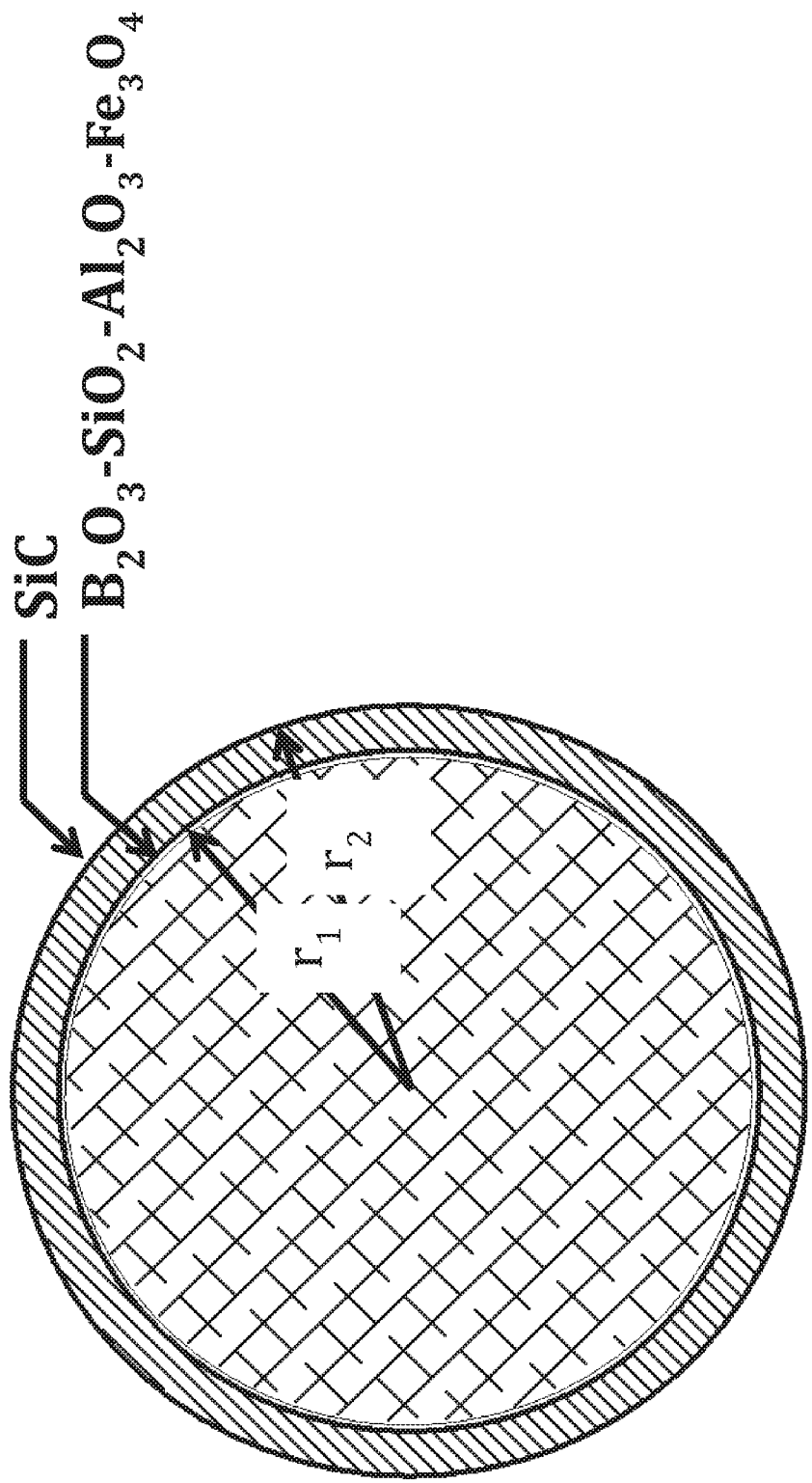

COMPOSITIONS, DEVICES, SYSTEMS AND METHODS FOR CONCENTRATING SOLAR POWER

CROSS-REFERENCE TO RELATED APPLICATIONS

This application claims the benefit of the filing date of U.S. Provisional Patent Application No. 62/099,311, filed on Jan. 2, 2015, by the inventors of this application, and incorporated herein by reference.

STATEMENT REGARDING FEDERALLY SPONSORED RESEARCH

This invention was made with government support under Grant Nos DE-FE0008400 and DE-EE0004008 awarded by the Department of Energy. The government has certain rights in the invention.

TECHNICAL FIELD OF THE INVENTION

The present disclosure relates generally to compositions, devices, systems, and methods for concentrating solar power. More particularly, the disclosure relates to compositions and methods of making and using these compositions that serve as a heat storage material or medium. The medium includes a transformative alloy composition (internal or inner core component) $Al-B-Si-Fe/Al_2O_3-B_2O_3-SiO_2-Fe_3O_4$ embedded in a SiC outer layer or coating.

BACKGROUND

Mounting concerns over the effect of greenhouse gases on global climate have focused attention on methods and systems for generating power and limiting greenhouse gas emissions. Solar power generation is particularly appealing because substantially no greenhouse gases are produced at the power generation source.

A concentrated or concentrating solar power (CSP) system collects solar energy and concentrates that energy onto an absorber. The absorbed optical energy provides a source of thermal energy to operate a power conversion cycle, for example a heat engine. The heat engine then produces electricity that is eventually fed into the electrical grid.

Concentrated solar power generation using solar receivers or collectors is also known. Briefly, concentrated solar power systems use lenses, mirrors, or other elements to focus sunlight from a relatively large area onto a small area called a solar receiver. The concentrated sunlight can be used to heat a fluid that serves as a thermal energy storage and transfer medium within the solar receiver. The fluid heated within the solar receiver can be used to drive a turbine to generate power.

For effective use of solar energy, the excess thermal energy needs to be collected and stored for later use, at times such as nighttime or cloudy days. A solar power tower uses focused solar radiation to concentrate solar power in a medium that can absorb and store thermal energy and later use it to generate steam from water or drive a turbine to generated electricity. These designs also allow power to be generated at a later time even when the sun is not shining.

Currently molten salts, mixtures of sodium nitrate and potassium nitrate, are employed as the thermal energy storage and transfer medium. Although these are non-flammable and non-toxic chemicals, they corrode the containing units. Thus, a more efficient thermal energy storage medium is required for more efficient and safer use of solar energy.

SUMMARY

In view of the aforementioned problems and trends, embodiments of the present disclosure provide compositions, devices, systems and methods for collecting, storing, and distributing heat.

Certain embodiments are directed to a thermal energy storage material which has a transformative alloy composition (internal or inner core component) of $Al-B-Si-Fe/Al_2O_3-B_2O_3-SiO_2-Fe_3O_4$ embedded in a SiC outer layer or coating.

Other aspects of the invention feature a method for generating a thermal energy storage composition which involves carburizing an $Al-B-Si-Fe$ alloy in a carbon monoxide atmosphere so as to form a SiC coating surrounding the $Al-B-Si-Fe$ alloy; and oxidizing the $Al-B-Si-Fe$ alloy by oxygen diffusion resulting in $Al_2O_3-B_2O_3-SiO_2-Fe_3O_4$ in a SiC coating.

In yet another aspect of the disclosure, a solar power apparatus, which has various components, including: a solar collector that collects solar energy; a solar receiver, operatively connected to the solar collector, wherein the receiver receives collected energy from the solar collector; a thermal storage transfer medium in the solar receiver, the fluidized medium containing an alloy embedded in a coating, wherein the solar energy from the solar collector is transferred to the embedded alloy; a storage container coupled to the solar receiver; a system for conveying the embedded alloy containing the solar energy from the thermal storage transfer medium to the storage container; a Brayton Cycle power generation system; and a system for transferring the solar energy from the embedded alloy in the storage container to the Brayton Cycle power generation system, is taught.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 3 is an illustration of the inner or internal core of the fully oxidized metal alloy with an outer protective layer of SiC, together forming a spherical particle as the absorbing thermal storage medium as described herein.

NOTATION AND NOMENCLATURE

Figure 1:
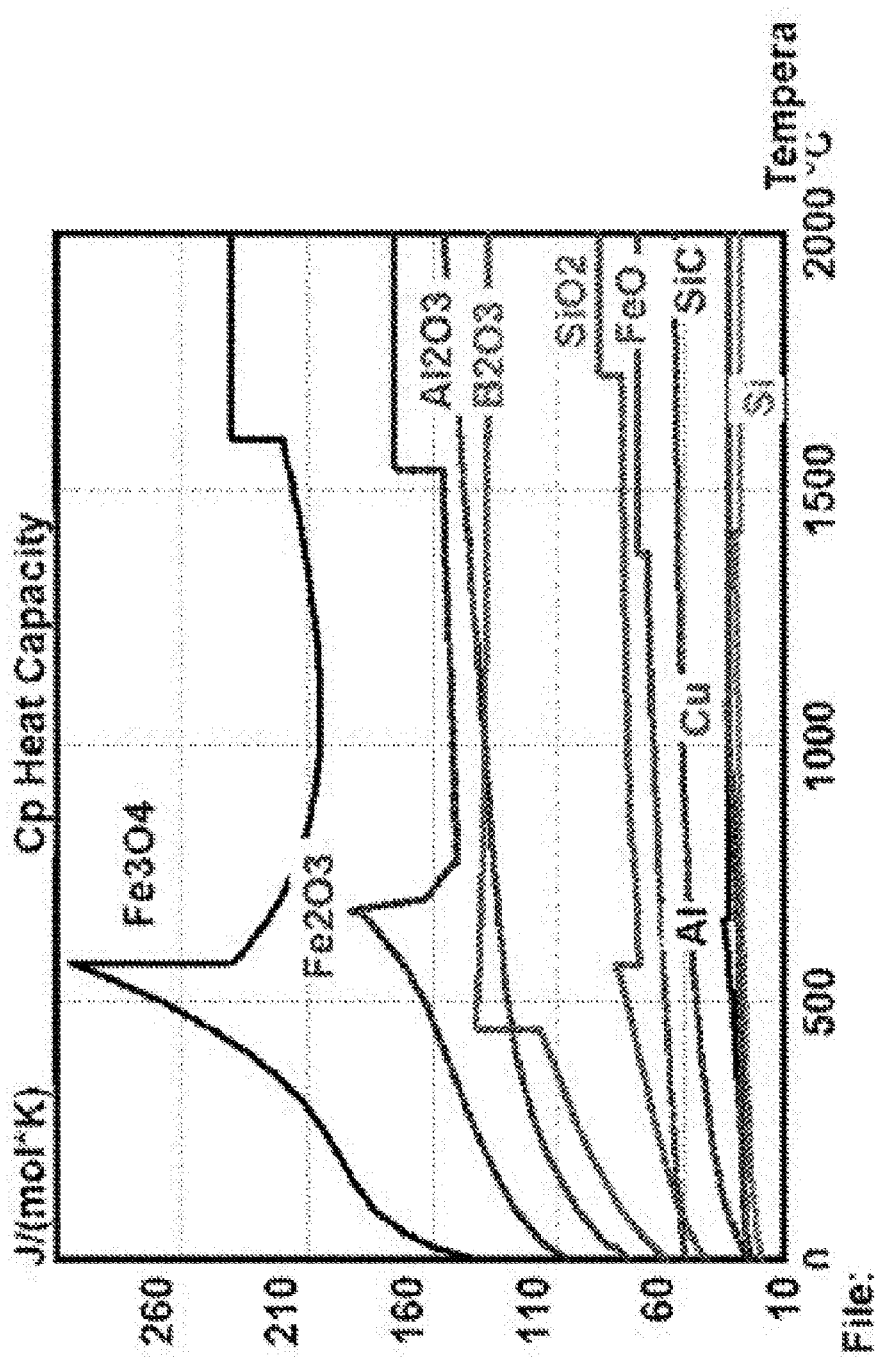
FIG. 1 is a graph depicting the heat capacity of major components for an $Al-B-Si-Fe/Al_2O_3-B_2O_3-SiO_2-Fe_3O_4$ CSP scheme as compared to Cu and FeO.

Certain terms are used throughout the following description and claims to refer to particular system components and configurations. As one skilled in the art will appreciate, the same component may be referred to by different names. This document does not intend to distinguish between components that differ in name but not function.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

As used in this specification and claim(s), the words "comprising" (and any form of comprising, such as "comprise" and "comprises"), "having" (and any form of having, such as "have" and "has"), "including" (and any form of including, such as "includes" and "include") and "containing" (and any form of containing, such as "contains" and "contain") are inclusive or open-ended and do not exclude additional, unrecited elements or method steps. Thus, they should be interpreted to mean "including, but not limited to . . . ."

Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Silicon carbide particles encapsulate (form an outer layer or coating on) a thermal energy storage medium or composition comprising a low-cost, highly stable internal core made of an alloy, namely, Al—B—Si—Fe. The components of the core alloy are then transformed to oxides, namely, $Al_2O_3$—$B_2O_3$—$SiO_2$—$Fe_3O_4$, whereby the core acquires a head absorbing capability enabling it to perform as a high temperature thermal energy storage medium. This thermal energy storage medium may be referred to as Al—B—Si—Fe/$Al_2O_3$—$B_2O_3$—$SiO_2$—$Fe_3O_4$, indicating that its composition is initially the alloy Al—B—Si—Fe and that it is subsequently transformed by oxidation into the alloy comprising oxides $Al_2O_3$—$B_2O_3$—$SiO_2$—$Fe_3O_4$. In view of this transformation, the core alloy may be referred to herein as a transformative alloy or the like. This thermal energy storage medium can be subsequently incorporated into methods, systems and devices for concentrating and transmitting solar power. The terms thermal storage medium, energy storage medium, and thermal energy storage medium are used interchangeably throughout this disclosure.

An energy storage composition, comprising the inner core (thermal energy storage medium) and outer coating, can be produced by, initially, carburizing an Al—B—Si—Fe alloy in a carbon monoxide atmosphere forming an outer layer of SiC. Methods of carburizing are known in the art as taught by *Physical Metallurgy for Engineers* by Donald S. Clark and Wilbur R. Varney (pp. 248-251, D. Van Nostrand Company, 1962) and *Physical Chemistry of High Temperature Technology* by E. T. Turkdogan (pp. 412-417, Academic Press, 1980), both incorporated by reference herein in its entirety. Because SiC is more stable than the other carbides, $Al_4C_3$, $B_4C$ and $Fe_3C$, that might be formed in this situation, an outer layer of SiC forms on the alloy rather than an outer layer of another carbide. The internal core of the Al—B—Si—Fe alloy, which is embedded in the SiC coating, serves as the heat absorption/desorption medium. The composition comprising the Al—B—Si—Fe alloy internal core embedded in the SiC coating may be referred to herein as a SiC/Al—B—Si—Fe composition.

Once the SiC/Al—B—Si—Fe composition is formed, the Al—B—Si—Fe alloy can be oxidized by oxygen diffusion into the core. The resulting oxidized form of the alloy, namely, $Al_2O_3$—$B_2O_3$—$SiO_2$—$Fe_3O_4$, has substantially increased heat absorption/desorption capability compared to the alloy before oxidation, yielding a high performance thermal or energy storage medium. Specifically, the internal core component (embedded alloy) may be used as a heat absorption/desorption medium for concentrating solar power.

FIG. 1 is a graph depicting the heat capacity of major components for an Al—B—Si—Fe/$Al_2O_3$—$B_2O_3$—$SiO_2$—$Fe_3O_4$ CSP scheme as compared to Cu and FeO. Heat capacity or thermal capacity is defined as the amount of heat required to raise the temperature of a material by 1° C. The SI unit of heat capacity is J/° C. (Joules per degree Celsius). As can be determined from the results depicted in FIG. 1, the Al—B—Si—Fe/$Al_2O_3$—$B_2O_3$—$SiO_2$—$Fe_3O_4$ components have a much higher heat capacity. Though the heat capacity of copper is usually considered high with a value approximating 31 J/(mol·K) at 1000° C., FIG. 1 indicates the significant contribution at 1000° C., for example, in the inherent heat capacities of $Fe_3O_4$ (195 J/(mol·K)), $Fe_2O_3$ (142 J/(mol·K)), $Al_2O_3$ (129 J/(mol·K)), $B_2O_3$ (128 J/(mol·K)) and $SiO_2$ (72 J/(mol·K)). In brief, the heat capacity represents the thermal energy or heat absorbed by the material when the material is subjected to a change in temperature by a given increment. Hence, $SiO_2$ absorbs more than twice as much as Cu, and even more dramatically, $F_3O_4$ absorbs more than six times as much as Cu.

Figure 2:
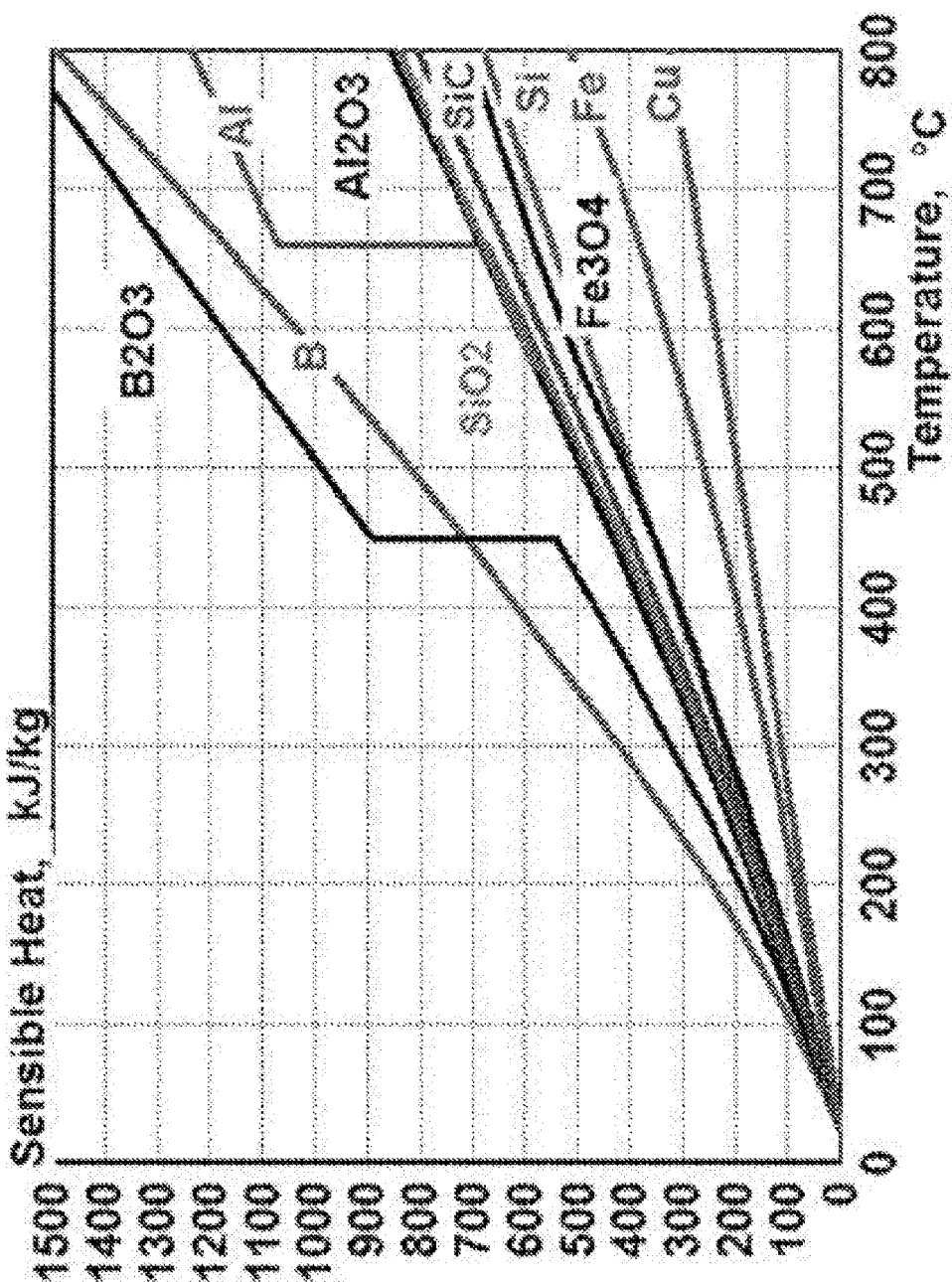
FIG. 2 is a graph of the sensible heat of major components for the $Al-B-Si-Fe/Al_2O_3-B_2O_3-SiO_2-Fe_3O_4$ alloy as compared to Cu.

FIG. 2 is a graph of the sensible heat of major components for the Al—B—Si—Fe/$Al_2O_3$—$B_2O_3$—$SiO_2$—$Fe_3O_4$ alloy as compared to Cu. Sensible heat is the heat gained or lost by a material resulting in a change in temperature. As illustrated by FIG. 2, $B_2O_3$ absorbs the greatest amount of heat (i.e. has the high level of sensible heat) as compared to the other oxides. Except for B and Al over a certain temperature range, the oxides absorb more heat than their corresponding elements alone.

Optimal particle/fluid interactions maximize the heat absorption of the absorption/desorption medium described herein. The heat absorption profile of an absorption/desorption medium can be adjusted by altering the composition of the internal or inner core embedded in the SiC outer layer or coating.

In certain aspects, the internal core may be composed of $B_2O_3$—$SiO_2$, B—$B_2O_3$—$SiO_2$, B—$B_2O_3$—Al, and/or $B_2O_3$—$SiO_2$—$Al_2O_3$—B, instead of or in addition to $B_2O_3$—$SiO_2$—$Al_2O_3$—$Fe_3O_4$. For example, a composition of 97 mol % $B_2O_3$—$SiO_2$, or 67 mol % $B_2O_3$—$SiO_2$ will form from carburizing a B—Si alloy to generate the SiC surrounding the B—Si core, and then oxidizing the B—Si/SiC particle will form a $B_2O_3$—$SiO_2$ core surrounded by a SiC outer layer or coating.

Combinations of compositions of the Al—B—Si—Fe/$Al_2O_3$—$B_2O_3$—$SiO_2$—$Fe_3O_4$ alloy will strengthen the core, but the key strengthening characteristics is the outer layer of SiC because of its hardness. An illustration of the fully oxidized metal alloy as the internal core with an outer layer of SiC is depicted in FIG. 3. The internal core with a radius of $r_1$ will be the key absorbing medium with the SiC outer layer between $r_1$ and $r_2$. At the inner radius of SiC, that is, at $r_1$, as an example, the solid carbide (SiC) will equilibrate with liquid 97 mol % $B_2O_3$—$SiO_2$ or liquid 67 mol % $B_2O_3$—$SiO_2$ at temperatures ranging from 500 to 1500° C.

As another example, for a liquid $B_2O_3$—$Al_2O_3$—$Fe_3O_4$ composition reacting with SiC, a liquid boria ($B_2O_3$) may form with either a solid oxide or a solid silicate layer depending on the compositions within the region of $r_1$. However, in both these examples (liquid boria with a solid oxide layer or liquid boria with a solid silicate layer), the internal boria core will still be liquid from 500 to 1500° C. with liquid boria having the highest sensible heat of the components shown in FIG. 2. As such, the high heat absorbing capacity of the liquid boria allows the alloy to store heat for extended periods of time. The total radius, i.e., $r_2$, can vary between 1 to 25 mm, providing for a range of spherical particle sizes of the energy storage composition.

Concentrated solar power systems can include solar receivers, and related devices to heat a fluid at a relatively low pressure. Heat from the low-pressure fluid heated by the solar receiver can be transferred to a relatively high-pressure fluid, which can be used to power a turbine, e.g., used as part of a Brayton Cycle. The heat exchange between the low- and high-pressure fluids can be accomplished via the use of a heat exchange system. While the energy conversion system used is preferably a Brayton Cycle conversion system, a Rankine Cycle conversion system may also be used depending on the overall design and functional needs of a system, device or apparatus.

The low-pressure fluid from the solar receiver, in addition to providing heat to the high-pressure working fluid, can be used to provide heat to a thermal or energy storage system. In certain aspects, the thermal or energy storage system includes one or more thermal or energy storage units which contain an absorption/thermal or energy storage Al—B—Si—Fe/$Al_2O_3$—$B_2O_3$—$SiO_2$—$Fe_3O_4$ medium as described herein. In certain aspects, the SiC outer coating of the thermal energy storage medium is configured to be within a fluidized bed. The thermal storage system can store heat from the low-pressure fluid or other heat sources in the system, which stored heat can be used by the system for operating the power cycle during periods of low sunlight.

In certain aspects, the thermal storage system provides heat to the low-pressure fluid in addition to or in place of heat provided by the solar receiver. In some embodiments, the thermal storage system can be coupled to the system driving a turbine. For example, a pressurized fluid can be moved through the thermal storage unit to heat the pressurized fluid prior to transporting the pressurized fluid to a turbine. The overall efficiency of a system can be improved by recovering heat from the low-pressure fluid exiting the heat exchange system.

Some embodiments can be used in coordination with solar power tower systems (also known as central tower solar power plants or heliostat solar power plants). Such systems include a plurality of heliostats arranged to redirect sunlight toward the top of a collector tower on which one or more solar receivers are mounted. The solar receiver may further comprise a plurality of receiver tubes within a plurality of solar receiving panels. In some such embodiments, the gas turbine and/or the compressor can be mounted at the top of the solar power tower. Other components, such as a thermal storage system can also be mounted at the top of or within other parts of the tower.

Solar power towers generate electric power from sunlight by focusing concentrated solar radiation on a tower-mounted receiver. Solar power tower systems typically include a cold storage tank, a solar receiver, heliostats, a hot storage tank, and an energy conversion system, such as a steam generator or turbine/generator set. In operation, a heat transfer fluid is pumped from the cold storage tank to the solar receiver. The heat transfer fluid is preferably the thermal energy storage Al—B—Si—Fe/$Al_2O_3$—$B_2O_3$—$SiO_2$—$Fe_3O_4$ medium as described herein, which has the capability to transfer heat and thermally maintain the heat in the medium.

The solar receivers function, at least in part, to convert solar radiation energy to thermal energy of a working fluid, e.g., a working fluid of a power generation or thermal storage system. The solar receivers typically comprise a low pressure fluid chamber that is designed and constructed to provide an insulated casing that acts to reduce or eliminate thermal losses from the solar receiver, to contain a low pressure working fluid and/or to provide a support structure for a solar absorber. The low pressure solar receivers also typically comprise a transparent object (e.g., window) positioned adjacent to an opening in the receiver for receiving solar radiation. The transparent object functions, at least in part, to contain the low pressure working fluid, to permit solar radiation to pass into the solar receiver (where the radiation impinges the solar absorber) and to eliminate or reduce thermal losses associated with re-radiation from the solar absorber.

In further embodiments, high pressure receivers are provided that may be used in conjunction with the power generation systems. The high pressure solar receivers function to convert solar radiation energy to thermal energy of a working fluid, e.g., a working fluid of a power generation system or thermal storage system. In some embodiments, the high pressure receivers include an insulated casing housing a high pressure solar absorber that acquires thermal energy by absorbing incident solar radiation. The high pressure fluid (e.g., fluid at a pressure of above 2 atmospheres to 50 atmospheres) entering the receiver passes through one or more fluid passages within the high pressure solar absorber and acquires thermal energy therein, in part, through contact with the passage wall(s). The high pressure solar absorber often has a black surface coating to promote absorption of incident solar radiation.

In some embodiments, secondary concentrators are provided. The secondary concentrator provides a mechanism for collecting concentrated solar radiation from a primary concentrator, e.g., a heliostat field, or other source, and directing that solar radiation into the opening of a solar receiver. The secondary concentrator typically improves the solar collection efficiency of the solar receiver.

In some embodiments, the secondary concentrator is constructed with a plurality of reflective panels, each reflective panel typically having a reflective surface and a predetermined shape. The plurality of reflective panels are typically arranged in a configuration that facilitates reflection of incident solar radiation toward the receiver opening. In certain embodiments the secondary concentrator includes cooling pipes that function in part to deliver cooling fluid to and from a cooling passage within each reflective panel.

Generally, fluid is transported through the solar receiver when the sun is available to provide energy to heat the fluid. In some cases, the relatively-low pressure fluid transported to the solar receiver can comprise the outlet stream of a turbine used to generate power within the system. However, the relatively low-pressure fluid can also originate from other sources, in addition to or in place of the exhaust stream of a turbine. For example, in some cases, relatively low-pressure fluid transported to the solar receiver can originate from the ambient environment (e.g., atmospheric air).

Once the relatively low-pressure fluid has been heated within the solar receiver, it can be transported out of the receiver. In certain aspects, at least a portion of the fluid within the stream exiting the receiver can be transported to a heat exchange (or recuperator) system. The heat exchange system can be used to transfer heat from the relatively low-pressure fluid stream (e.g., from a solar receiver and/or from a thermal storage system) to a relatively high-pressure fluid stream, which can be used to drive a gas turbine.

After the heat from the relatively low-pressure stream has been transported to the relatively-high pressure stream, the relatively low-pressure fluid can be transported out of the heat exchange system. In some embodiments, at this juncture, the low-pressure stream can contain residual heat, which can be recovered within a heat recovery system to increase system efficiency.

Certain embodiments are directed to a system that includes a thermal or energy storage system comprising the absorption/desorption thermal or energy storage medium described herein. The thermal storage system can include a single thermal or energy storage unit, while in other embodiments, the thermal storage system can include a plurality of thermal or energy storage units.

Thermal energy from the sun can be stored either as latent heat or sensible heat. Sensible heat has to do with the heat capacity of a material. The added thermal energy stored in an energy storage medium manifests as an increase in temperature. The thermal or energy storage system disclosed herein can be used to store sensible heat for use during periods of relatively low sunlight and/or during startup of the system. During periods of relatively high sunlight, at least a portion of the fluid containing the thermal or energy storage medium exiting the solar receiver can be transported to the thermal storage system where the heat can be retained for later use.

During periods of low sunlight, a fluid containing the thermal or energy storage medium can be transported into the thermal storage system where heat stored within the thermal storage system is used to heat the fluid to produce high-temperature fluid, which can be transported to a heat exchange system. In some embodiments, the fluid supplied can comprise the exhaust stream of a turbine.

In some cases, during periods of low sunlight, little or no fluid is supplied to the solar receiver, and the fluid from the exhaust stream of the turbine can be re-directed to a thermal energy storage system. In certain aspects, a controller and valves are used to regulate the distribution of fluid through the solar receiver and thermal energy storage system.

As noted above, the thermal or energy storage system can include one or more thermal storage units. The thermal storage unit(s) can enable a practical and cost effective method to achieve thermal storage of CSP energy for use in generating electricity during hours with no or low sunlight. In some embodiments, a thermal storage unit can comprise a tank in which solid media (which includes the alloy of the present disclosure) with passages through which the fluid flows is disposed to store the thermal energy at relatively high temperatures (e.g., at least about 600° C. to at least about 1500° C.).

To compete with traditional generation technologies, electricity produced from intermittent solar energy can lead to high thermodynamic efficiency, but efficient heat transfer from the thermal storage medium disclosed herein to the working fluid is required. The disclosed compositions, systems, and methods solve these problems by utilizing a thermal storage unit with properties disclosed herein.

In certain aspects, a thermal storage unit has an inlet and/or an outlet. In certain other aspects, the thermal storage unit includes plates or other devices for containing the thermal storage medium described herein. The plates can comprise one or more passageways. The plates can be designed or configured so fluid can flow or be transported through the plate while the plate supports or contains the thermal storage media. In yet other aspects, the thermal storage media is heated by an incoming fluid to a temperature between 600 to 1500° C.

A thermal storage unit can be fabricated using a variety of materials including, for example, metals (e.g., stainless steel). In some embodiments, a thermal storage unit is configured such that it is a certified pressure vessel (e.g., ASME-certified, EN13445 certified, or a pressure vessel meeting a similar set of certification standards). Containment plates can be fabricated from any suitable material, including metals (e.g., stainless steel, refractory metals such as tungsten, and the like), ceramics, and/or combinations of these materials. In certain aspects, the thermal storage unit is configured to avoid the transport of thermal storage media out of the thermal storage unit.

The thermal or energy storage media used in the thermal or energy storage unit(s) is the thermal or energy storage $Al$—$B$—$Si$—$Fe/Al_2O_3$—$B_2O_3$—$SiO_2$—$Fe_3O_4$ medium described herein. In some embodiments, the thermal storage media has a heat capacity of at least about 600 J/kg K, at least about 800 J/kg K, or at least about 900 J/kg K.

The thermal storage $Al—B—Si—Fe/Al_2O_3—B_2O_3—SiO_2—Fe_3O_4$ media within the thermal storage unit(s) can be of any suitable form factor and size. For example, pellets in the form of beads or rods (e.g., substantially spherical pellets or pellets with any of the shapes described below) with maximum cross-sectional diameters in mm, cm, or larger length scales (as described below) can be used. In some embodiments, the thermal storage media can comprise pellets, and at least about 50%, at least about 75%, at least about 90%, at least about 95%, or at least about 99% of the pellets have maximum cross-sectional diameters of less than about 100 cm, less than about 10 cm, less than about 1 cm, between about 1 mm and about 100 cm, or between about 1 cm and about 100 cm. Suitable pellet shapes include, but are not limited to, shapes that are substantially spherical, substantially rectangular prisms (e.g., rods, bricks, substantially cubic shapes), substantially triangular prisms, substantially spheres, bow ties, honeycombs, saddles, and the like. In one set of embodiments, the thermal storage media can comprise elongated tubes through which heated fluid is transported.

Many of the components can be fluidically connected. Two components are "fluidically connected" when they are constructed and arranged such that a fluid can flow between them. In some cases, two components can be "directly fluidically connected," which is used to refer to a situation in which the two components are constructed and arranged such that a fluid can flow between them without being transferred through a unit operation component constructed and arranged to substantially change the temperature and/or pressure of the fluid. One of ordinary skill in the art would be able to differentiate between unit operation components that are constructed and arranged to substantially change the temperature and/or pressure of a fluid (e.g., a compressor, a condenser, a heat exchanger, etc.) and components are not so constructed and arranged (e.g., a transport pipe through which incidental heat transfer and/or pressure accumulation may occur). In certain aspects, systems and devices can include arrangements in which components are fluidically connected but not directly fluidically connected.

In another embodiment, a solar energy conversion device which has at least one thermal storage unit containing the thermal or energy storage $Al—B—Si—Fe/Al_2O_3—B_2O_3—SiO_2—Fe_3O_4$ medium described herein, is taught. The device may have additional solar energy conversion components such as a plurality of heliostats for focusing solar energy, a solar receiver coupled to the heliostats, a cold storage tank coupled to the thermal storage unit, a hot storage coupled to the cold storage tank for storing the thermal energy storage medium, and an energy conversion system coupled to the hot storage tank. The medium is used for a concentrating solar power apparatus which operates at a temperature between 600° C. and 1500° C.

In yet another embodiment, a solar power apparatus which includes the embedded thermal storage medium, is disclosed. The apparatus may have at least one solar collector that collects solar energy; a solar receiver, operatively connected to the solar collector, wherein the receiver receives collected energy from the solar collector. The solar collector transfers collected solar energy to the fluidized thermal storage medium in the solar receiver which due to its high heat capacity can retain the solar energy prior to the transfer of the solar energy to a storage container by any conventional system for conveying solar energy (e.g. pipes, plates etc.). A Brayton Cycle power generation system uses the stored solar energy in the embedded alloy to generate power by, for example, turning water into steam to turn a turbine engine.

Also taught are methods of using the embedded thermal or energy storage $Al—B—Si—Fe/Al_2O_3—B_2O_3—SiO_2—Fe_3O_4$ medium described herein in a solar power tower system. The method may include the steps of: storing the thermal storage medium in a cold storage tank; pumping the thermal storage medium to a solar receiver; heating the thermal storage medium to a temperature of at least 600° C.; storing the heated thermal storage medium in a hot storage tank; pumping the heated thermal storage medium to an energy conversion system to generate power; and returning the thermal storage medium to the cold storage tank.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A thermal energy storage composition comprising an inner core of Al—B—Si—Fe embedded in an outer coating of silicon carbide (SiC), wherein the inner core is oxidized to generate $Al_2O_3—B_2O_3—SiO_2—Fe_3O_4$.

2. The composition of claim 1, wherein the thermal energy storage composition is in the form of a plurality of rods or beads.

3. A solar energy conversion device comprising the thermal energy storage composition of claim 1 within a thermal storage unit.

4. The device of claim 3, further comprising a plurality of heliostats for focusing solar energy, a solar receiver coupled to the heliostats, a cold storage tank coupled to the thermal storage unit, a hot storage coupled to the cold storage tank for storing the thermal energy composition, and an energy conversion system coupled to the hot storage tank.

5. The device of claim 3, wherein the thermal energy storage composition is used for a concentrating solar power apparatus operating at a temperature between 600° C. and 1500° C.

6. The device of claim 4, wherein the energy conversion system is selected from the group consisting of a Rankine Cycle conversion system and a Brayton Cycle conversion system.

7. The device of claim 4, further comprising a secondary concentrator.

8. The device of claim 4, further comprising at least one turbine engine.

9. The device of claim 4, further comprising a heat exchange system.

10. The device of claim 4, further comprising a heat recovery system.

11. The device of claim 4, wherein the solar receiver comprises a low pressure fluid chamber.

12. The device of claim 4, wherein the solar receiver comprises a high pressure fluid chamber or a solar absorber.

13. A solar power apparatus, comprising:
a solar collector that collects solar energy;
a solar receiver, operatively connected to the solar collector, wherein the receiver receives collected energy from the solar collector;
a thermal storage transfer medium in the solar receiver, the medium containing an $Al_2O_3$—$B_2O_3$—$SiO_2$—$Fe_3O_4$ alloy embedded in a SiC coating, wherein the solar energy from the solar collector is transferred to the embedded alloy;
a storage container coupled to the solar receiver;
a system for conveying the embedded alloy containing the solar energy from the thermal storage transfer medium to the storage container;
a Brayton Cycle power generation system coupled to the storage container; and
a system for transferring the solar energy from the embedded alloy in the storage container to the Brayton Cycle power generation system.

* * * * *